United States Patent

Kropp

[11] Patent Number: 5,563,354
[45] Date of Patent: Oct. 8, 1996

[54] LARGE AREA SENSING CELL

[75] Inventor: Harry C. Kropp, Barrington, Ill.

[73] Assignee: Force Imaging Technologies, Inc., Chicago, Ill.

[21] Appl. No.: 415,484

[22] Filed: Apr. 3, 1995

[51] Int. Cl.⁶ ........................................ G01L 1/00
[52] U.S. Cl. .................... 73/862.473; 73/862.381; 280/731; 280/732
[58] Field of Search ........................ 280/731, 732; 200/61.54, 511; 324/446, 724; 73/862.041, 862.044, 862.046, 862.54, 862.637, 862.642, 862.68

[56] References Cited

U.S. PATENT DOCUMENTS

| | | | |
|---|---|---|---|
| 3,806,471 | 4/1974 | Mitchell | 200/511 |
| 4,489,302 | 12/1984 | Eventoff | 338/99 |
| 4,640,137 | 2/1987 | Trull et al. | 73/862.04 |
| 4,701,659 | 10/1987 | Fujii et al. | 310/334 |
| 4,738,146 | 4/1988 | Baumgartner et al. | 73/862.68 |
| 4,856,993 | 8/1989 | Maness et al. | 433/68 |
| 5,033,291 | 7/1991 | Podoloff et al. | 73/172 |
| 5,036,306 | 7/1991 | Bergkvist | 73/862.68 |
| 5,060,527 | 10/1991 | Burgess | 73/862.68 |
| 5,086,652 | 2/1992 | Kropp | 73/767 |
| 5,222,399 | 6/1993 | Kropp | 73/862.68 |
| 5,265,904 | 11/1993 | Shelton et al. | 280/731 |
| 5,265,905 | 11/1993 | Shelton | 280/731 |
| 5,269,559 | 12/1993 | Filion et al. | 280/728 |
| 5,269,560 | 12/1993 | O'Loughlin et al. | 280/736 |
| 5,275,432 | 1/1994 | Pray et al. | 280/728 A |
| 5,296,837 | 3/1994 | Yaniger | 338/47 |
| 5,302,936 | 4/1994 | Yaniger | 338/47 |
| 5,398,962 | 3/1995 | Kropp | 280/731 |

FOREIGN PATENT DOCUMENTS

| | | | |
|---|---|---|---|
| 505915 | 3/1976 | U.S.S.R. | 73/862.68 |
| 2115556 | 9/1983 | United Kingdom . | |

Primary Examiner—Richard Chilcot
Assistant Examiner—Ronald Biegel
Attorney, Agent, or Firm—Laff, Whitesel, Conte & Saret, Ltd.

[57] ABSTRACT

A thin film force sensor designed to sense application of a force over a wide area. In one embodiment, a large area sensing cell is provided that comprises a first planar electrode configured as a perimetric conductive portion circumscribing at least one additional perimetric conductive portion, with the conductive portions electrically connected together through at least one conductive path and a second planar electrode configured as a perimetric conductive portion circumscribing at least one additional perimetric conductive portion, with the conductive portions electrically connected together through at least one conductive path. The second planar electrode confronts the first planar electrode, with a pressure sensitive resistive material interposed between the first planar electrode and the second planar electrode. The conductive portions of the first planar electrode are substantially coextensive with the conductive portions of the second planar electrode, such that application of a broad force applying means anywhere within the perimeter of the perimetric conductive portion is electrically discernible, and a conductive lead extends from each electrode for providing an electrical termination for the electrode.

19 Claims, 5 Drawing Sheets

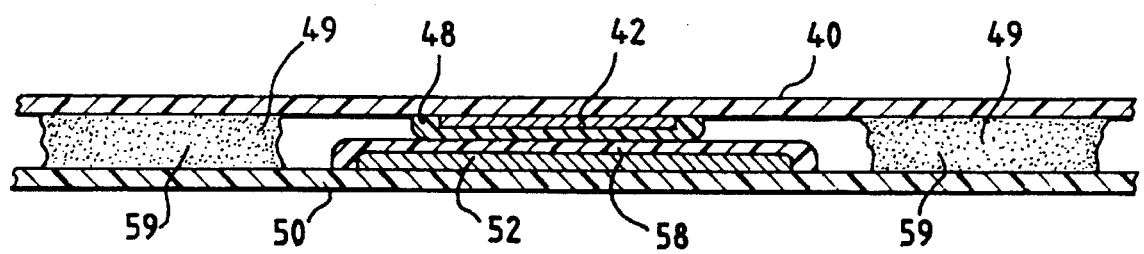
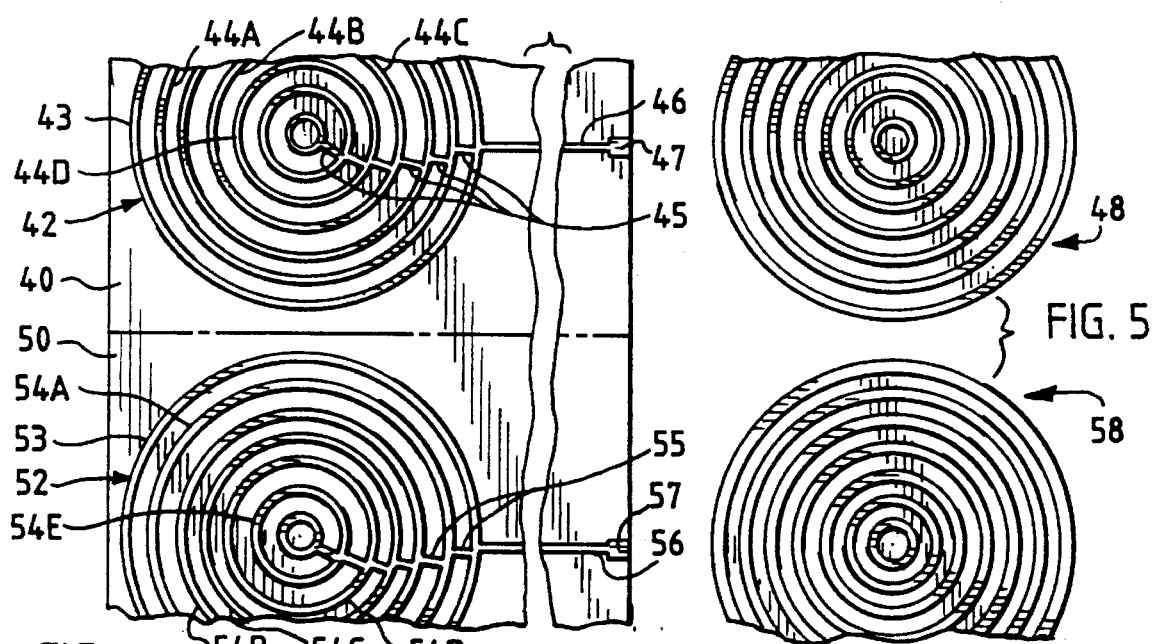
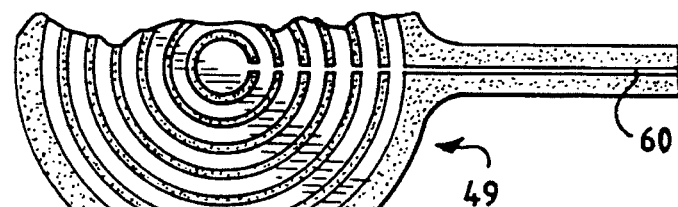
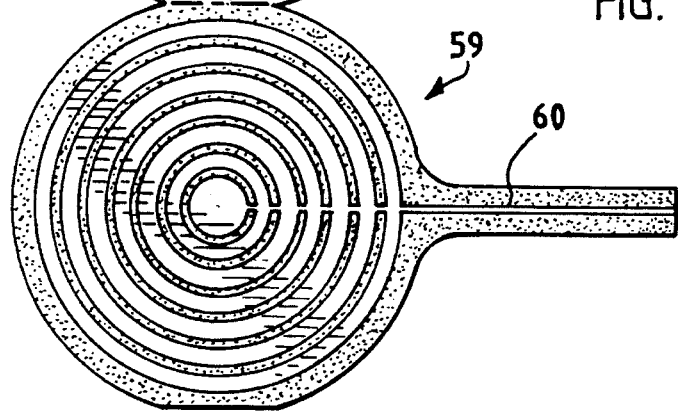

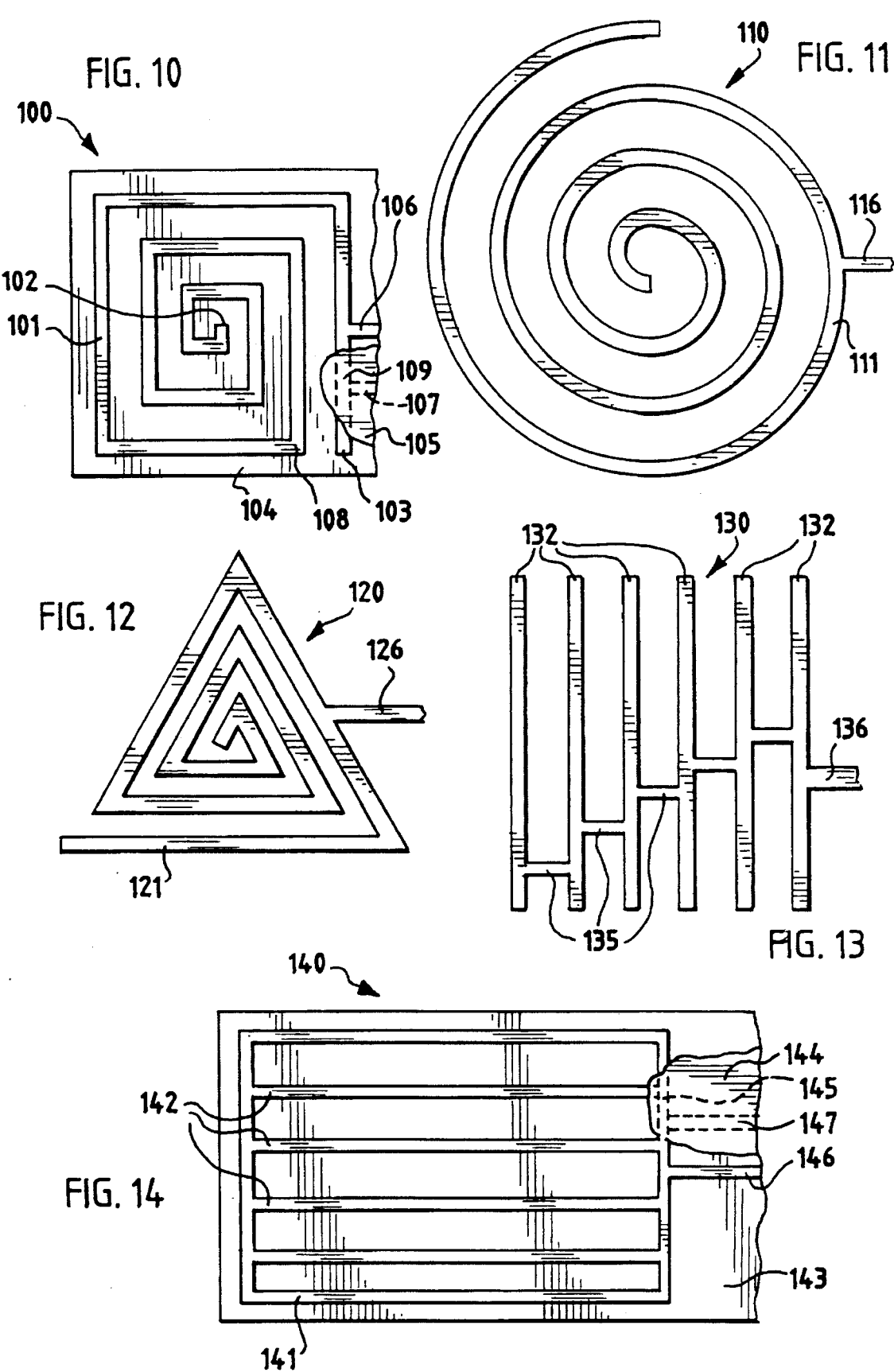

LARGE AREA SENSING CELL

FIELD OF THE INVENTION

This invention relates generally to thin film force sensors and in particular to a thin film force sensing cell designed to sense application of a force over a wide area.

BACKGROUND OF THE INVENTION

Thin film force sensors have been designed for a variety of purposes. Typically, such thin film sensors employ a pair of thin support sheets, one or more conductive ink electrodes on each support sheet with the conductive electrodes on the support sheets facing each other, pressure sensitive material between the facing electrodes, for example, in the form of a thin layer over each electrode, and an adhesive material bonding the sheets together.

Coverage over a wide area has been accomplished by using grids of electrodes. However, these require many, many terminals. In other cases, patterns of multiple electrode pairs have been used to provide coverage over a relatively wide area. Yet another possibility is to use very expansive electrode pairs, such as a pair of electrodes each three inches in diameter, or in another expansive configuration to cover a broad area, such as an area three inches in diameter. Although use of such large electrode pairs will reduce the number of terminals and leads necessary, large area electrodes are prone to spurious outputs and to the effects of shear forces. They also use substantial amounts of conductive ink, and, of course, substantial quantities of corresponding pressure sensitive resistive material.

Accordingly, a need arises for an improved wide-area pressure sensitive, thin-film sensing cell that is not prone to spurious outputs or to the effects of shear forces, that minimizes the use of inks, and that is effective, over the entire area, in producing a signal in response to a load that tends to be relatively broadly distributed, rather than occurring at only a point or a very small region.

SUMMARY OF THE INVENTION

These desiderata and others are satisfied by the present invention, in which a large area sensing cell is provided that comprises a first planar electrode configured as a perimetric conductive portion circumscribing at least one additional perimetric conductive portion, with the conductive portions electrically connected together through at least one conductive path and a second planar electrode configured as a perimetric conductive portion circumscribing at least one additional perimetric conductive portion, with the conductive portions electrically connected together through at least one conductive path. The second planar electrode confronts the first planar electrode, with a pressure sensitive resistive material interposed between the first planar electrode and the second planar electrode. The conductive portions of the first planar electrode are substantially coextensive with the conductive portions of the second planar electrode, such that application of a broad force applying means anywhere within the perimeter of the perimetric conductive portion is electrically discernible, and a conductive lead extends from each electrode for providing an electrical termination for the electrode.

In the preferred embodiment, the large area sensing cell further comprises adhesive disposed in laterally spaced, adjacent relationship to the electrodes to restrain lateral movement of the electrodes relative to each other.

In one embodiment, the perimetric conductive portions are generally circular, while in other embodiments they are rectangular, square, triangular, or star-shaped. The perimetric conductive portions may be discontinuous or continuous.

In another embodiment, the large area sensing cell comprises a first planar electrode configured as a spiral-form conductive portion with a first end near a predetermined central point and a second end distal from the central point, and having an outermost conductive circumscribing segment, and a second planar electrode configured as a spiral-form conductive portion with a first end near a predetermined central point and a second end distal from the central point, with the first planar electrode confronting the second planar electrode. A pressure sensitive resistive material is interposed between the first planar electrode and the second planar electrode, with the conductive portion of the first planar electrode being substantially coextensive with the conductive portion of the second planar electrode, such that application of a broad force applying means anywhere within a boundary defined by the outermost conductive circumscribing segment is electrically discernible. A conductive lead extends from each electrode for providing an electrical termination for the electrode. The spiral-form conductive portions may be disposed in the form of a smooth curve from the first end to the second end, in a rectangular form comprising a series of linear conductive portions electrically connected and perpendicular to adjacent conductive portions, or in a triangular form comprising a series of linear conductive portions electrically connected to adjacent conductive portions, and meeting the adjacent conductive portions at angles that are less than 90°.

In a further embodiment of the invention, the large area sensing cell comprises a first conductor having a perimetric configuration with a plurality of internal conductor portions extending therefrom and circumscribed thereby, and a second conductor having a perimetric configuration with a plurality of internal conductor portions extending therefrom and circumscribed thereby, with the second conductor and internal conductor portions confronting the first conductor and internal conductor portions. A pressure sensitive resistive material is interposed between the first conductor and the second conductor, such that application of force within the perimetric configuration of the first conductor is electrically discernible. A conductive lead extends from each of the first and second conductors for providing an electrical termination for each of the conductors. In one embodiment, the internal conductor portions extend across spaced apart portions of the first and second conductors.

In still another embodiment of the invention, the large area sensing cell comprises a first conductor arranged as a group of spaced, elongated conductive portions, each conductive portion electrically connected to adjacent conductive portions through at least one conductive path, with exterior conductive portions and conductive portion end-points defining a first conductor perimeter, and a second conductor arranged as a group of spaced, elongated, conductive portions, each conductive portion electrically connected to adjacent conductive portions through at least one conductive path, with exterior conductive portions and conductive portion end-points defining a second conductor perimeter, and the second conductor confronting the first conductor. A pressure sensitive resistive material is interposed between the first conductor and the second conductor, such that application of force within the first conductor perimeter or the second conductor perimeter is electrically discernible. A conductive lead extends from each of the first conductor and the second conductor for providing an electrical termination for each of the conductors. In one embodiment, the conductive portions are parallel, linear, and of substantially equal length.

In yet another embodiment of the invention, the large area sensing cell comprises a first conductor having a first conductive portion and a plurality of spaced, elongated conductive segments, each having first and second ends and being electrically connected to the first conductive portion at the first ends only, with the second ends and the first conductive portion defining a first conductor perimeter, and a second conductor arranged as a first conductive portion and a plurality of spaced, elongated conductive segments, each having first and second ends and being electrically connected to the first conductive portion at the first ends only, with the second ends and the first conductive portion defining a second conductor perimeter, and the second conductor confronting the first conductor. A pressure sensitive resistive material is interposed between the first conductor and the second conductor, such that application of force within the first conductor perimeter or the second conductor perimeter is electrically discernible. A conductive lead extends from each of the first conductor and the second conductor for providing an electrical termination for each of the conductors.

In one embodiment, the conductive segments are parallel, linear, and of substantially equal length.

Further objects, features and advantages of the present invention will become apparent from the following description and drawings.

BRIEF DESCRIPTION OF THE DRAWINGS

FIG. 3 is a cross-sectional view taken along line 3—3 of FIG. 2;

FIG. 4 shows portions of the sensor of FIG. 2 prior to assembly, including the support sheets and printed electrodes and leads;

FIG. 5 shows the pressure sensitive material patterns to be disposed on the electrodes of FIG. 4, as they are embodied in FIG. 2;

FIG. 6 shows the adhesive material patterns to be disposed on the support sheets of FIG. 4, as they are embodied in FIG. 2;

FIG. 10 is a generally rectangular spiral-formed large area sensor of the present invention;

FIG. 11 is a large area sensor like that of FIG. 10, but of a circular spiral-formed type;

FIG. 12 is a large area sensor like that of FIG. 10, but of a generally triangular spiral-formed type;

FIG. 13 is a large area sensor showing another embodiment of the present invention;

FIG. 14 is a large area sensor showing a further embodiment of the present invention;

DETAILED DESCRIPTION

Figure 1:
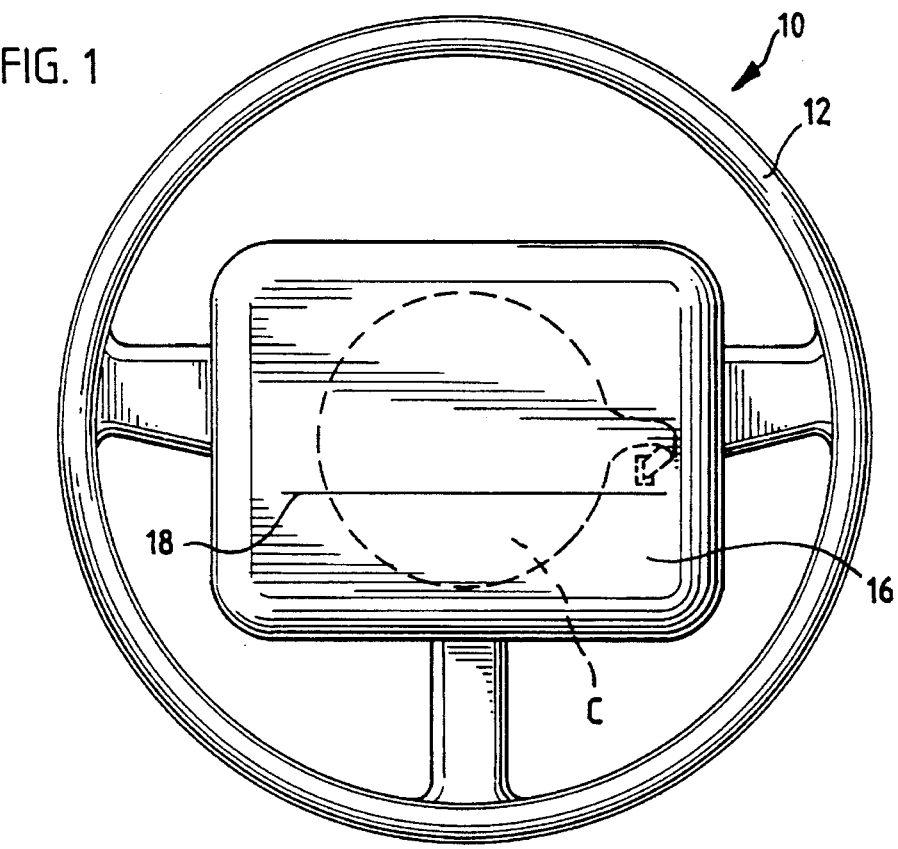
FIG. 1 is a schematic automobile steering wheel assembly with which large area sensors of the present invention may be used.
Figure 2:
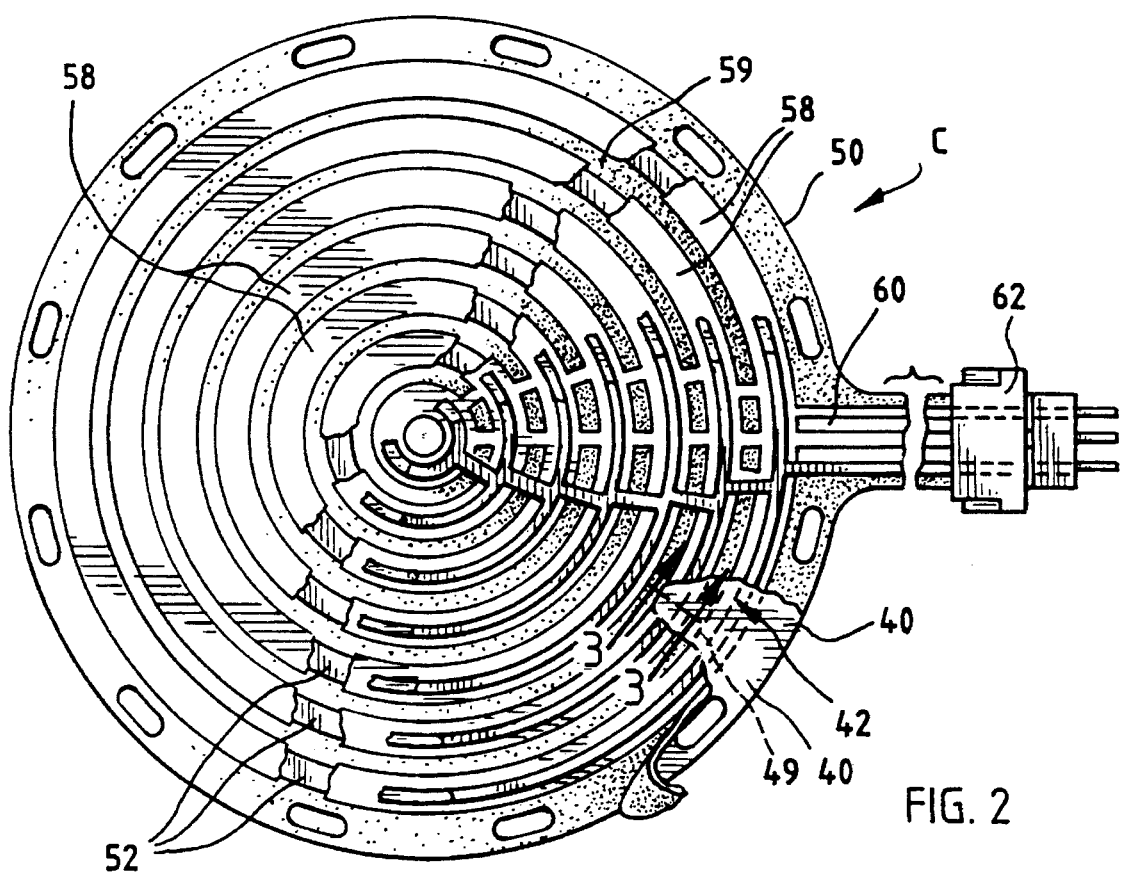
FIG. 2 is a plan view of a large area sensor of the present invention.

Referring now to the drawings, a large area sensor cell C in accordance may be employed in a steering wheel assembly 10. Assembly 10 may include a steering wheel 12 suitably mounted on a steering column (not shown) of an automobile. The steering wheel may in turn support an airbag and horn actuator assembly within its perimeter and generally centrally thereof. The actuator assembly may include a cover such as a soft, flexible outer cover 16 which overlies the airbag and which serves as a decorative cover for the horn actuator assembly. Cover 16 may define a weakened seam 18 through which the airbag may be deployed when it is activated.

The sensor cell C may employ load sensor components of the general types disclosed in U.S. Pat. Nos. 5,222,399 and 5,086,652, and may be from 0.002 to 0.005 inches in thickness. Cell C thus comprises a pair of thin, flexible plastic support or backing sheets, as of a transparent polyester film. Each is provided with a suitable electrode pattern. The electrodes may be silver deposited from a silver based ink, may be screen printed on the backing sheets, and are disposed in a confronting pattern. A pressure sensitive resistive material, deposited as by a screen-printing process, is interposed between the confronting electrodes. The pressure sensitive resistive material may be a carbon-molybdenum disulfide material in a polyester binder.

Each of the electrodes terminates in a conductor or lead which in turn terminates in a suitable electrical termination. The terminations are connected, via suitable conductors, to circuitry which can determine the resistance and changes in resistance between the confronting electrodes, and which can process and provide outputs as desired and in a known manner.

Referring now especially to the large area sensor cell of FIGS. 2–6, sensor C comprises electrodes a first support or backing sheet 40 on which is disposed a first planar electrode 42. A second support or backing sheet 50 supports a second planar electrode 52. Electrode 42 is overlaid by a pressure sensitive resistive layer 48 and a like pressure sensitive resistive layer 58 overlies electrode 52. The electrode widths may differ to make certain that they always confront within the width and length of the narrower of the two electrodes. Similarly, the pressure sensitive resistive material is of a greater width than the respective electrodes, thereby to assure appropriate contact throughout the extent of the confronting electrodes.

To assure the stability of the assembled backing sheets, electrodes and pressure sensitive resistive layers, adhesive layers 49, 59 are disposed in laterally spaced, adjacent relationship to the electrodes (see FIG. 3). Adhesive layers are of a synthetic rubber based pressure sensitive adhesive. A preferred such adhesive is available from A.W.T. World Trade Incorporated, 4321 N. Knox Avenue, Chicago, Ill. 60641, as MEM Screen Printing Adhesive. This restrains lateral movement of the electrodes relative to each other, tends to maintain the layers of pressure sensitive material in casual contact with each other, and limits the effects of shear forces.

These features are apparent from FIGS. 3–6, which show the electrode patterns, the pressure sensitive resistive layer patterns, and adhesive patterns. It is also to be noted, in FIG. 6, that the adhesive is patterned to provide a channel 60 free of adhesive from the center of the sensor to an edge of the sensor to allow any trapped air to escape. The edge in the embodiment shown (see FIG. 2) is at the location of the electrical termination 62 for the sensor C.

In the embodiment of FIGS. 2–6, the first planar electrode 42 is configured as a continuous perimetric conductive portion 43 circumscribing at least one additional continuous generally perimetric conductive portion, in this case comprising a series of such portions 44A, 44B, 44C, etc. The portions 43 and 44A, etc., are electrically connected together through at least one conductive path, as shown in FIG. 4 by electrode portions 45.

Similarly, second planar electrode 52 is configured as a continuous perimetric conductive portion 53 circumscribing at least one additional generally perimetric conductive portion, in this case comprising portions 54A, 54B, 54C, etc. Portions 53 and 54A, are electrically connected together through at least one conductive path, as shown in FIG. 4 by electrode portions 55.

Electrode 42 is connected by a lead 46 to a termination 47 and electrode 52 is connected by a lead 56 to a termination 57. When the electrodes 42, 52 are positioned to overlie each other, leads 46, 56 and terminations 47, 57 do not overlie each other. Instead, they are laterally spaced to avoid electrical contact.

To provide for the response to changes in loading, the pressure sensitive resistive material layers 48, 58 which are provided between the confronting electrode portions will respond to the application of a broad force, such as that resulting from loading by the heel of a hand or thumb pressure or the like, anywhere within or closely adjacent to the perimeter of the perimetric conductive portions 43, 53 so that the load applied will be electrically discernible.

In a preferred form of the sensor of FIGS. 2–6, the sensor C has a diameter of about 4.6 inches. The first perimetric electrode portion 42 has an outer diameter of about 3.9 inches. The electrode portions 43, 44A, 44B, etc. are spaced inwardly of each other by a radial distance of about 0.3 inch. The width of electrode portions 43, 44A, etc. is about 0.05 inch. The second perimetric electrode portion 52, and portions 53, 54A, 54B, etc. thereof, are similarly sized and spaced, except that the widths thereof are about 0.1 inch. The widths of the adhesive layers between the electrode portions are about 0.1 inch, and they are spaced away from the pressure sensitive layers 48 and 58 which overlie the electrodes 42, 52.

Figure 7:
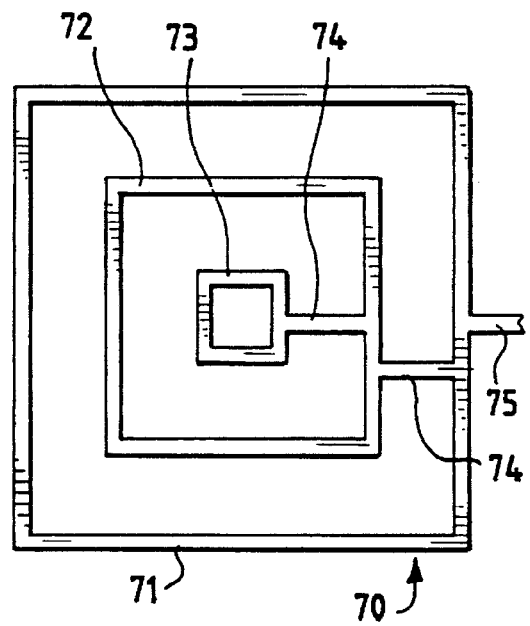
FIG. 7 is a schematic representation of a continuous perimeter rectangular electrode pattern of the type employed in the sensor of FIG. 2.

As will be appreciated, configurations other than generally circular electrode patterns and configurations may be employed. Thus, the large area sensor 70 of FIG. 7 shows a rectangular electrode pattern in which an outer continuous perimetric conductive portion 71 circumscribes inner additional continuous perimetric conductive portions 72, 73, each of which is connected by a conductive electrode portion 74. A lead 75 leads to a termination (not shown). This large area sensor 70 also employs a pair of confronting electrode patterns, support sheets, etc. (only one of which electrode patterns is illustrate in FIG. 7) as was described in connection with FIGS. 2–6.

Figure 8:
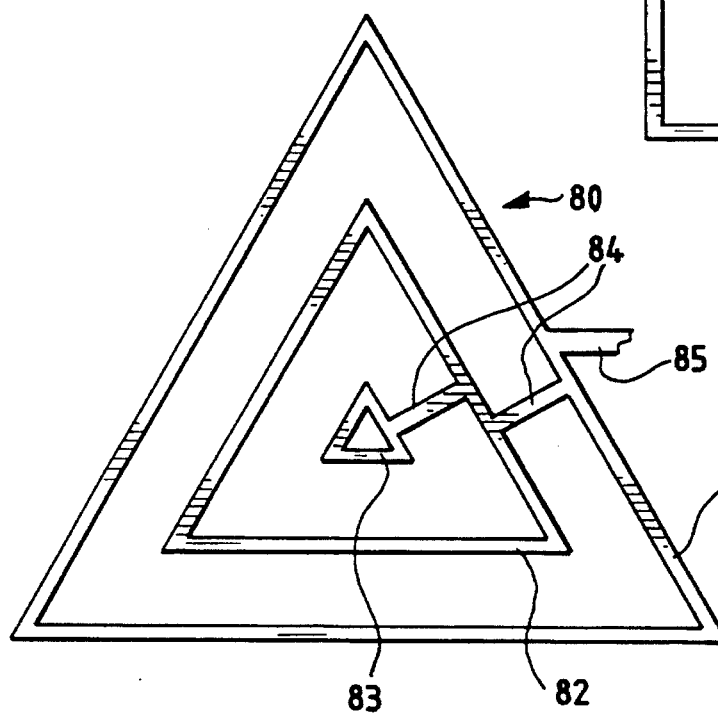
FIG. 8 is a schematic representation of a continuous perimeter triangular electrode pattern of the type employed in the sensor of FIG. 2.

The large area sensor of FIG. 8 employs a triangular pattern of electrodes, including an outer continuous perimetric conductive portion 81 circumscribing inner additional triangular perimetric portions 82, 83, each of which is connected by conductive path electrode portions 84. Again, a lead 85 leads to a termination (not shown). Sensor 80 also employs confronting electrode patterns, support sheets, adhesive, etc. (only one of which electrode pattern is illustrated in FIG. 8), as was described in connection with FIGS. 2–6.

Figure 9:
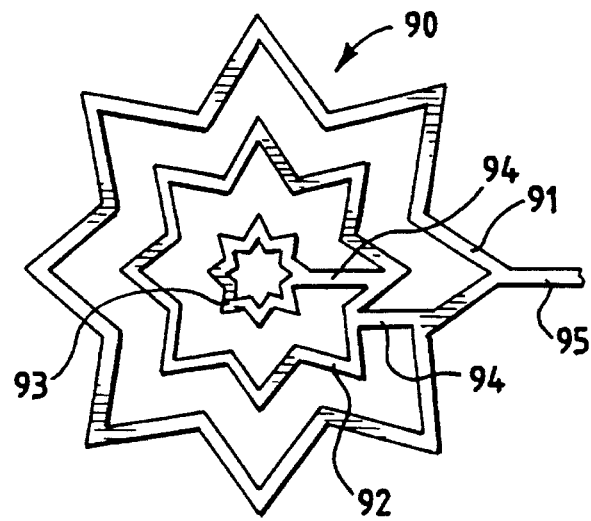
FIG. 9 is a schematic representation of a continuous perimeter star shaped electrode pattern of the type employed in the sensor of FIG. 2.

Star-shaped large area sensor 90 of FIG. 9 includes electrodes having a continuous outer perimetric portion 91, continuous inner perimetric portions 92, 93, connecting conductive pattern portions 94, and a lead 95, as well as pressure sensitive resistive patterns, adhesive, backing sheets, etc., and is arranged and functions as described above in detail in connection with FIGS. 2–8.

The large area sensing cells of FIGS. 10–12 employ spiral-formed conductive electrode patterns.

FIG. 10 illustrates a large area sensing cell 100 in which a first planar electrode 101 is configured as a generally rectangular, spiral-form conductive portion that has a first end 102 near a predetermined central point and a second end 103 distal from the central point, and has an outermost circumscribing segment extending from the second end 103 to an exterior point 108.

As described above with reference to FIGS. 2–6, the electrode 101 is deposited onto a support surface or backing sheet 104. A second planar electrode 109 is visible through the transparent upper backing sheet 105. As will be noted from an examination of FIG. 10, the first and second planar electrodes are substantially coextensive, and confront one another throughout their lengths, with adhesive material and pressure sensitive resistive material interposed between the electrodes as described previously.

The first and second planar electrodes have conductive leads, 106 and 107, respectively, for providing electrical terminations (not shown) for the electrodes. Just as in previously described embodiments, application of a broad force applying means, such as a thumb or the heel of a hand, anywhere within the boundary defined by the outermost circumscribing segment described above, is electrically discernible.

As is apparent from FIG. 10, the spiral-form conductive portions of the large area sensing cell 100 of FIG. 10 are disposed in the form of a rectangle comprising a series of linear conductive portions electrically connected and perpendicular to adjacent conductive portions.

Unlike the configuration of FIG. 10, the large area sensing cell 110 of FIG. 11 includes planar electrodes (only one electrode 111 being shown) that describe smooth curves from their first outer end to their second inner ends. Construction details, including lead 116, are in all respects similar to those of the embodiments described above.

The large area sensing cell 120 of FIG. 12 also has electrodes that are configured in spiral forms (only one of which electrode 121 is shown), which comprise substantially triangular segments which are continuous from an outer end to a second inner end. These triangular, spiral-form conductive portions comprise a series of linear conductive portions electrically connected to adjacent conductive portions, and meeting these adjacent conductive portions at angles that are less than 90°. Construction details of this cell 120 includes a least 126 and other details similar to the embodiments described above.

FIG. 13 depicts a large area sensing cell 130 having yet another electrode configuration. The large area sensing cell 130 has a first conductor that is arranged as a group 132 of spaced, elongated conductive portions, with each of these spaced, elongated conductive portions 132 being connected to adjacent conductive portions through at least one conductive path 135. A conductive lead 136 extends from one of the conductive portions 132 to provide an electrical termination for the first conductor.

Of course, the spaced, elongated conductive portions 132 may take any general shape. They could be curved or piece-wise linear segments. In FIG. 13, the elongated conductive portions 132 are shown as parallel, linear, and of substantially equal length.

The exterior conductors from among the group of conductors 132, and the conductor end points, define a perimeter for this first conductor. Just as previously described, the large area sensing cell 130 is formed from confronting conductors that are substantially coextensive. The second conductor is not shown, but has a perimeter defined in the same way as the first conductor perimeter.

Just as in previously described embodiments, pressure sensitive resistive material is interposed between first and second conductors, such that the application of a force within the perimeter defined by the first and second conductors is electrically discernible.

FIG. 14 illustrates still another large area sensing cell 140. In this embodiment, a first conductor 141 having a perimetric configuration is deposited on a lower backing sheet or support surface 143. In FIG. 14, this first conductor 141 is shown as a closed rectangular conductor, but it may also be discontinuous and still retain its perimetric character. A plurality of internal conductor portions 142 extend from the first conductor 141, and between portions thereof, and are circumscribed by the first conductor 141. These internal conductor portions 142 may extend only a short distance into the interior of the circumscribing first conductor 141, or the internal conductor portions 142 may extend across the entire width of the sensing cell 140, as shown.

As described with reference to the other embodiments, the wide area sensing cell 140 further includes a second conductor 145 that is visible in FIG. 14 on the portion of the upper backing sheet 144 shown. This second conductor 145 is similar in shape and size to the first conductor 141. The lower and upper backing sheets, 143 and 144, respectively, are positioned so that the first and second conductors, 141 and 145, and their respective internal conductor portions, confront one another.

Pressure sensitive resistive material is interposed between the first and second conductors 141, 145 such that application of force within the perimetric configuration of the first or second conductor is electrically discernible. Leads 146 and 147 are provided, extending from the first and second conductors, respectively, for providing an electrical termination for each of the first and second conductors.

Figure 16:
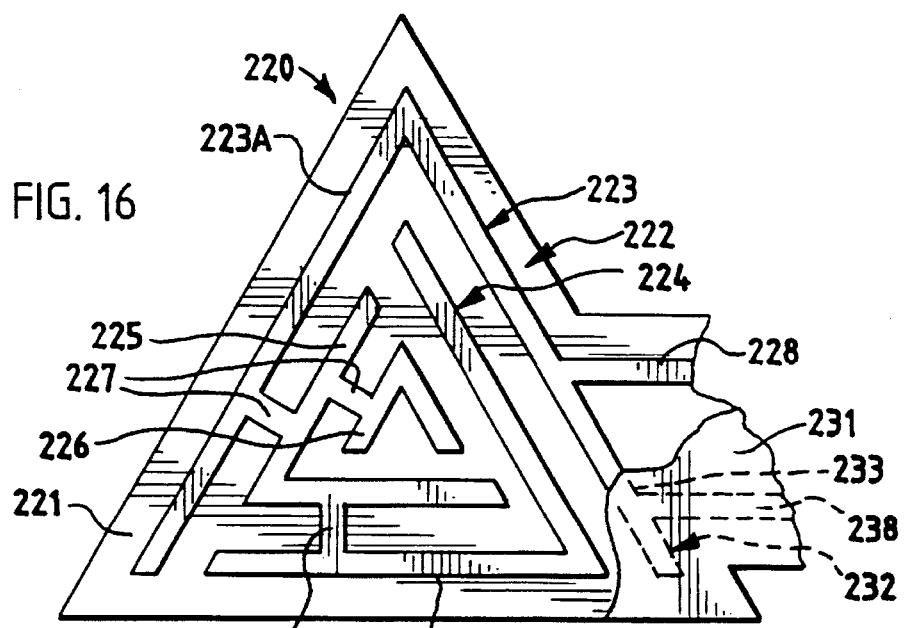
FIG. 16 is yet another embodiment of a large area sensor having discontinuous outer perimetric electrode portions.
Figure 15:
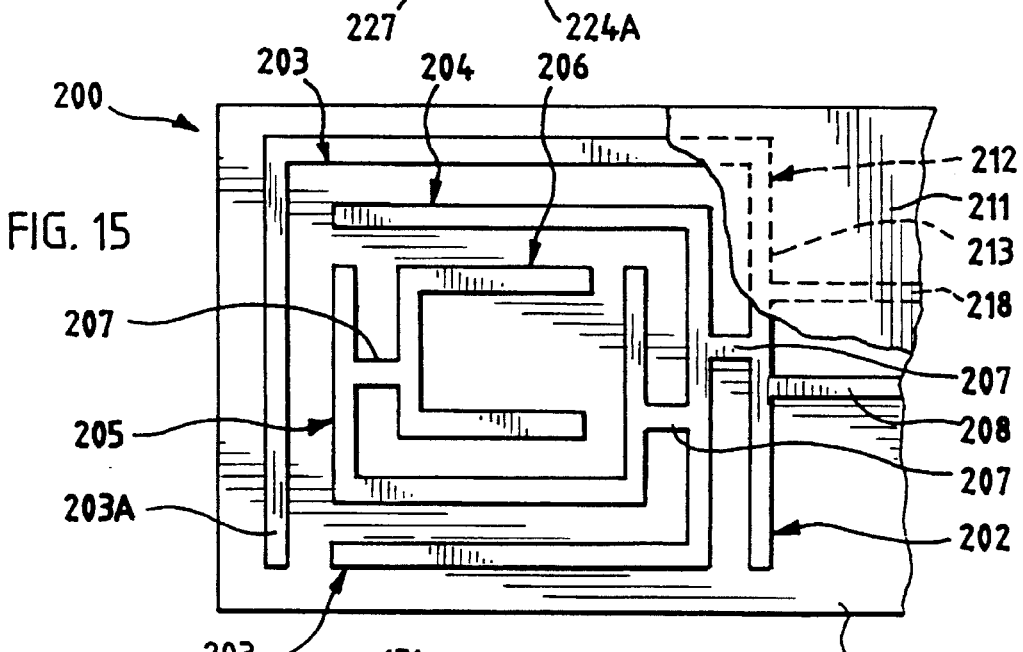
FIG. 15 is a large area sensor like that of FIG. 8, but in which the outer perimetric electrode portions are discontinuous.

FIGS. 15 and 16 represent still further large area sensor cell embodiments. Referring first to FIG. 15, sensor cell 200 is generally rectangular in shape. Its electrode portions are spaced, like those of the preceding embodiments, so that the application of a broad force anywhere within the perimeter of the outer electrode portions will provide an electrical response to the loading.

In FIG. 15, a first backing sheet 201 supports an electrode 202. Electrode 202 is covered by a pressure sensitive resistive layer as described above. Electrode 202 comprises an outer discontinuous perimetric first planar electrode portion 203 which is made up of a generally U-shaped portion 203A and the segment 204A of a further generally U-shaped electrode portion 204. Additional discontinuous inner perimetric conductive electrode portions are made up of segments of internal U-shaped electrode portions 204, 205 and 206.

Similarly, a second backing sheet 211 supporting a complementary electrode 212 made up of a series of discontinuous perimetric electrode portions and segments, covered by a pressure sensitive resistive layer as described above is provided. Electrode 212 similarly comprises an outer discontinuous perimeter first planar electrode portion 213, and inner discontinuous perimetric electrode portions (not illustrated).

Each of the electrodes employs conductive portions providing conductive paths, such as bridging portions or elements 207, which connect electrode portions 203, 204, 205 and 206. Finally, conductive leads 208, 218, respectively, lead from the electrodes 202, 212 for providing electrical terminations. Adhesive layers and the other structural features of the preceding embodiments may be employed as well.

The outer perimeter of the electrode pattern of FIG. 15 may be, for example, three inches in each direction. In that case, the electrode portions are spaced about one-half inch apart. Of course, additional electrode portions may be used so that the anticipated breadth of the typical load applying force will assure that some portion of the confronting electrodes will be loaded, thereby to signal that a force has been applied.

Referring now to FIG. 16, this embodiment is similar to that of FIG. 15, except that the pattern of the electrode portions is generally triangular, rather than rectangular. Thus, the bottom backing sheet 221 of the large area sensing cell 220 supports an electrode 222. Electrode 222 is covered by a pressure sensitive resistive layer as described above. Electrode 222 comprises an outer discontinuous perimetric first planar electrode 223 which is made up of a generally V-shaped segment 223A and a segment 224A of a further generally V-shaped segment 224. Additional discontinuous internal perimetric conductive portions are made up of segments of internal V-shaped segments 224, 225 and 226.

Similarly, a second backing sheet 231 supporting a complementary electrode 232 made up of a series of discontinuous perimetric electrode segments, covered by a pressure sensitive resistive layer as described above, is provided. Electrode 232 similarly comprises an outer discontinuous perimetric first planar electrode portion 233, and inner discontinuous perimetric electrodes portions (not illustrated).

Each of the electrodes employs conductive portions providing conductive paths, such as path elements 227, which connect segments 223, 224, 225 and 226. Finally, conductive leads 228, 238, respectively, lead from the electrode portions for providing electrical terminations. Again, adhesive may be applied, as in the manner described in detail regarding FIGS. 2–6.

Figure 17:
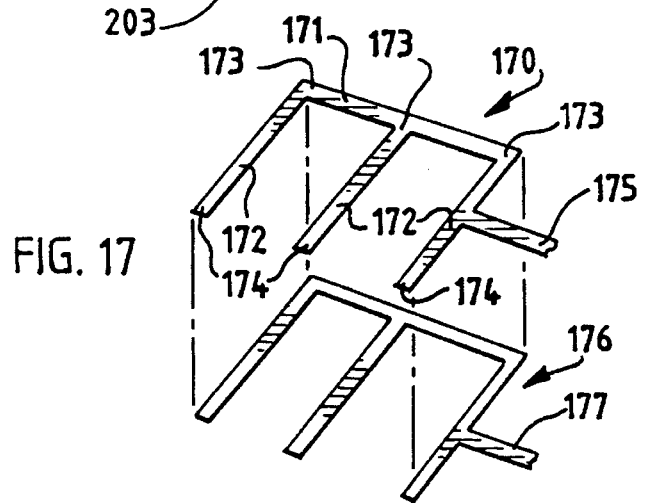
FIG. 17 is yet another embodiment of a large area sensor of the present invention.

FIG. 17 depicts yet another configuration, in which a large area sensing cell 170 comprises a first conductor that is arranged as a first linear conductive portion 171 with a plurality of equally spaced, parallel, linear conductive portions 172 being electrically connected to the first linear conductive portion 171 at first ends 173 only. The first conductive portion 171, the outermost portions 172, and the second ends 174 of the plurality of linear conductive portions 172 define a first conductor perimeter. A second conductor 176 made up like conductor 171, 172, is provided.

Construction of the large area sensor cell 170 is similar to that described previously, in that each of a pair of conductors like conductor 171, 172 is disposed on a facing support surface (not shown). A conductive lead 175, 177 extends from the conductors to provide an electrical termination. Pressure sensitive resistive material is interposed between the confronting conductors, and application of a force within the conductor perimeters is electrically discernible.

Described herein is a large area sensing cell that is free from shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A large area sensing cell comprising:
    a first planar electrode configured as a perimetric conductive portion substantially circumscribing at least one additional perimetric conductive portion, with said conductive portions electrically connected together through at least one conductive path;
    a second planar electrode configured as a perimetric conductive portion substantially circumscribing at least one additional perimetric conductive portion, with said conductive portions electrically connected together through at least one conductive path, said second planar electrode confronting said first planar electrode;
    a pressure sensitive resistive material interposed between said first planar electrode and said second planar electrode; and
    said conductive portions of said first planar electrode being substantially coextensive with said conductive portions of said second planar electrode, such that application of a broad force applying means anywhere within the perimeter of said perimetric conductive portion is electrically discernible; and
    a conductive lead extending from each electrode for providing an electrical termination for said electrode.

2. The large area sensing cell of claim 1, further comprising adhesive disposed in laterally spaced, adjacent relationship to said electrodes to restrain lateral movement of said electrodes relative to each other.

3. The large area sensing cell of claim 1, wherein said perimetric conductive portions are generally circular.

4. The large area sensing cell of claim 1, wherein said perimetric conductive portions are rectangular.

5. The large area sensing cell of claim 4, wherein said rectangular perimetric conductive portions are square.

6. The large area sensing cell of claim 1, wherein said perimetric conductive portions are triangular.

7. The large area sensing cell of claim 1, wherein said perimetric conductive portions are star shaped.

8. The large area sensing cell of claim 1, wherein said perimetric conductive portions are continuous.

9. The large area sensing cell of claim 1, wherein said perimetric conductive portions are discontinuous.

10. A large area sensing cell comprising:
    a first planar electrode configured as a spiral-form conductive portion with a first end near a predetermined central point and a second end distal from said central point, and having an outermost conductive circumscribing segment;
    a second planar electrode configured as a spiral-form conductive portion with a third end near a predetermined central point and a fourth end distal from said central point, said first planar electrode confronting said second planar electrode;
    a pressure sensitive resistive material interposed between said first planar electrode and said second planar electrode; and
    said conductive portion of said first planar electrode being substantially coextensive with said conductive portion of said second planar electrode, such that application of a broad force applying means anywhere within a boundary defined by said outermost conductive circumscribing segment is electrically discernible; and
    a conductive lead extending from each electrode for providing an electrical termination for said electrode.

11. The large area sensing cell of claim 10, wherein said spiral-form conductive portions are disposed in the form of a smooth curve from said first end to said second end.

12. The large area sensing cell of claim 10, wherein said spiral-form conductive portions are disposed in the form of a rectangle comprising a series of linear conductive portions electrically connected and perpendicular to adjacent conductive portions.

13. The large area sensing cell of claim 10, wherein said spiral form conductive portions are disposed in the form of a triangle comprising a series of linear conductive portions electrically connected to adjacent conductive portions, and meeting said adjacent conductive portions at angles that are less than 90°.

14. A large area sensing cell comprising:
    a first conductor having a perimetric configuration with a plurality of internal conductor portions extending therefrom and circumscribed thereby;
    a second conductor having a perimetric configuration with a plurality of internal conductor portions extending therefrom and circumscribed thereby, said second conductor and internal conductor portions confronting said first conductor and internal conductor portions;
    a pressure sensitive resistive material interposed between said first conductor and said second conductor, such that application of force within the perimetric configuration of said first conductor is electrically discernible; and
    a conductive lead extending from each of said first and second conductors for providing an electrical termination for each of said conductors.

15. The large area sensing cell of claim 14, wherein said internal conductor portions extend across spaced apart portions of said first and second conductors.

16. A large area sensing cell comprising:
    a first conductor arranged as a group of spaced, elongated conductive portions, each conductive portion electrically connected to adjacent conductive portions through at least one conductive path, with exterior conductive portions and conductive portion end-points defining a first conductor perimeter;
    a second conductor arranged as a group of spaced, elongated, conductive portions, each conductive portion electrically connected to adjacent conductive portions through at least one conductive path, with exterior conductive portions and conductive portion end-points defining a second conductor perimeter, and said second conductor confronting said first conductor;
    a pressure sensitive resistive material interposed between said first conductor and said second conductor, such that application of force within said first conductor perimeter or said second conductor perimeter is electrically discernible; and
    a conductive lead extending from each of said first conductor and said second conductor for providing an electrical termination for each of said conductors.

17. The large area sensing cell of claim 16, wherein said conductive portions are parallel, linear, and of substantially equal length.

18. A large area sensor cell comprising:

a first conductor having a first conductive portion and a plurality of spaced, elongated conductive segments, each having first and second ends and being electrically connected to said first conductive portion at said first ends only, with said second ends and said first conductive portion defining a first conductor perimeter;

a second conductor having a second conductive portion and a plurality of spaced, elongated conductive segments, each having third and fourth ends and being electrically connected to said second conductive portion at said third ends only, with said fourth ends and said second conductive portion defining a second conductor perimeter, said second conductor confronting said first conductor;

a pressure sensitive resistive material interposed between said first conductor and said second conductor, such that application of force within said first conductor perimeter or said second conductor perimeter is electrically discernible; and a conductive lead extending from each of said first conductor and said second conductor for providing an electrical termination for each of said conductors.

19. The large area sensing cell of claim 18, wherein said conductive segments are parallel, linear, and of substantially equal length.

* * * * *